(12) United States Patent
Wu et al.

(10) Patent No.: US 10,570,583 B2
(45) Date of Patent: Feb. 25, 2020

(54) POWER EQUIPMENT, DRIVING DEVICE OF TRENCH CUTTER AND TRENCH CUTTER

(71) Applicant: Xuzhou Construction Machinery Group Co., Ltd., Xuzhou (CN)

(72) Inventors: Xingcong Wu, Xuzhou (CN); Yanling Luo, Xuzhou (CN); Wen Zheng, Xuzhou (CN)

(73) Assignee: Xuzhou Construction Machinery Group Co., Ltd., Xuzhou (CN)

( * ) Notice: Subject to any disclaimer, the term of this patent is extended or adjusted under 35 U.S.C. 154(b) by 482 days.

(21) Appl. No.: 15/360,786

(22) Filed: Nov. 23, 2016

(65) Prior Publication Data

US 2017/0073930 A1  Mar. 16, 2017

Related U.S. Application Data

(63) Continuation of application No. PCT/CN2015/073091, filed on Feb. 15, 2015.

(30) Foreign Application Priority Data

Jul. 14, 2014 (CN) .......................... 2014 1 0334983

(51) Int. Cl.
*E02F 5/02* (2006.01)
*E02F 9/20* (2006.01)
(Continued)

(52) U.S. Cl.
CPC .................. *E02F 9/20* (2013.01); *E02F 5/02* (2013.01); *E02F 5/14* (2013.01); *F16D 3/06* (2013.01)

(58) Field of Classification Search
CPC ....... E02F 3/20; E02F 5/02; E02F 5/14; E02F 9/08; E02D 9/02; E02D 17/13;
(Continued)

(56) References Cited

U.S. PATENT DOCUMENTS 3,559,312 A * 2/1971 Fox et al. ................. E02F 9/02
                                                                37/423
5,192,116 A * 3/1993 Turner ................. E21D 9/1013
                                                                299/31
(Continued)

FOREIGN PATENT DOCUMENTS

CN          101285310 B      8/2010
CN          202296945 U      7/2012
(Continued)

OTHER PUBLICATIONS

International Search Report (including English translation) dated May 12, 2015 in PCT Application No. PCT/CN2015/073091. 4 pages.

(Continued)

*Primary Examiner* — Scott A Smith
(74) *Attorney, Agent, or Firm* — Kilpatrick Townsend & Stockton LLP (57) ABSTRACT

Power equipment, a driving device of trench cutter, and a trench cutter are disclosed. The power equipment comprises a motor, a motor installation seat with an inner cavity having a first installation hole and a second installation hole in respective ends, and a transmission shaft. The motor, at the upper part of the seat, is sealingly connected with the seat. A motor output shaft extends into the inner cavity through the first installation hole. One end of the transmission shaft extends into the inner cavity through the second installation hole and is drivingly connected with the motor output shaft. The middle part of the transmission shaft and the second installation hole are sealingly connected; the other end of the transmission shaft extends from the second installation hole. A motor oil drainage cavity can be sealed by sealing the seat without changing the structure of the motor without a lip seal.

5 Claims, 8 Drawing Sheets

(51) Int. Cl.
*E02F 5/14* (2006.01)
*F16D 3/06* (2006.01)

(58) Field of Classification Search
CPC ......... E21D 9/1013; E21B 4/003; F16D 3/06; F16D 3/185
USPC ............ 173/91, 213, 217; 175/91, 296, 229; 299/31, 75
See application file for complete search history.

(56) References Cited

U.S. PATENT DOCUMENTS

| | | | |
|---|---|---|---|
| 5,641,003 A | 6/1997 | Rey et al. | |
| 5,964,305 A * | 10/1999 | Arzberger | F16D 3/185 175/91 |
| 7,363,734 B2 * | 4/2008 | Arzberger | E02F 3/205 175/229 |
| 2005/0091885 A1 * | 5/2005 | Arzberger | E02D 17/13 37/347 |
| 2006/0053665 A1 * | 3/2006 | Arzberger | E02D 17/13 37/352 |

FOREIGN PATENT DOCUMENTS

| | | |
|---|---|---|
| CN | 103029222 A | 4/2013 |
| CN | 103600429 A | 2/2014 |
| CN | 203584374 U | 5/2014 |
| CN | 204019757 U | 12/2014 |
| EP | 0391236 A2 | 10/1990 |
| EP | 0848112 A1 | 6/1998 |
| EP | 1529924 A1 | 5/2005 |
| EP | 1637794 A1 | 3/2006 |

OTHER PUBLICATIONS

Extended European Search Report dated Mar. 28, 2018 in EP Patent Application No. 15822455.0. 15 pages.
Communication pursuant to Article 94(3) EPC dated Jan. 29, 2019 in EP Patent Application No. 15822455.0. 5 pages.

* cited by examiner

POWER EQUIPMENT, DRIVING DEVICE OF TRENCH CUTTER AND TRENCH CUTTER

CROSS-REFERENCES TO RELATED APPLICATIONS

This application is a continuation application of PCT application PCT/CN2015/073091 entitled "POWER APPARATUS, SLOTTER DRIVE DEVICE AND SLOTTER," filed on Feb. 15, 2015, which claims priority to Chinese Patent Application No. 201410334983.2, filed on Jul. 14, 2014, which are herein incorporated by reference in their entirety for all purposes.

FIELD OF THE INVENTION

The present invention relates to the field of engineering machinery, and specifically relates to power equipment, a driving device of trench cutter and a trench cutter.

BACKGROUND OF THE INVENTION

A double-wheel trench cutter is a foundation engineering construction machine with high construction efficiency. In the double-wheel trench cutter, a hydraulic motor drives a decelerator to drive a cutting wheel to cut rocks into trench, with the maximum cutting depth reaching 150 m. With the increase of the cutting depth, the pressure of a motor oil drainage cavity also increases. The oil drainage cavity of the common motor adopts a lip seal, and the maximum pressure borne by the common motor is 0.3 MPa, so the common motor at the depth of more than 30 m cannot meet the pressure bearing requirement and thereby cannot work normally.

Figure 1:
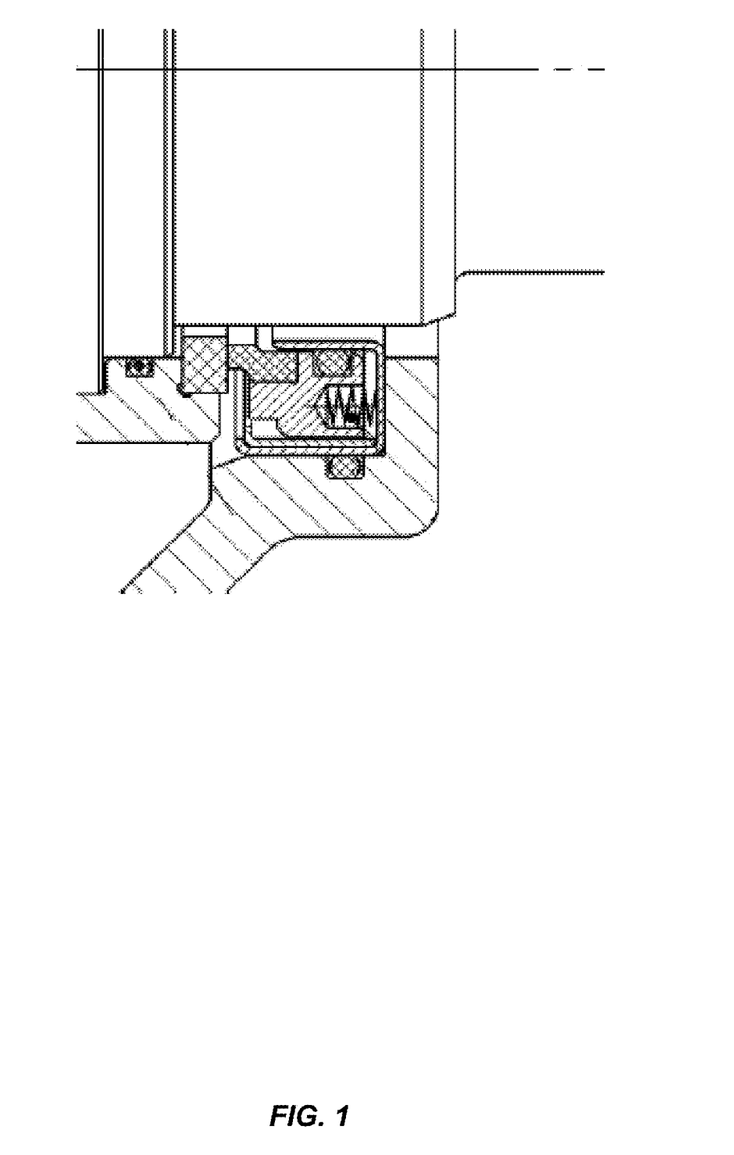
FIG. 1 is a schematic diagram of a local cross section of a mechanical oil seal of a special motor in the prior art.

In order to solve the pressure bearing problem of the motor, in the prior art, a specially designed motor is adopted, see FIG. 1, specifically, the lip seal of the motor oil drainage cavity is changed into a mechanical seal, and the mechanical seal is at the same position as the lip seal and is between a motor shell and a motor output shaft.

The inventor discovers that, the prior art has the following problems: in the prior art, although the mode of changing the lip seal of the motor oil drainage cavity into the mechanical seal can solve the pressure bearing problem of the motor, the special design of the motor may lead to difficulty in purchase and maintenance of the motor, meanwhile, the purchase cost of the motor may be greatly increased, so that it is unfavorable for the popularization of the double-wheel trench cutter.

BRIEF SUMMARY OF THE INVENTION

One of the purposes of the present invention is to provide power equipment with good pressure bearing capacity, a driving device of trench cutter and a trench cutter.

According to an aspect of the present invention, the present invention provides power equipment, including a motor, a motor installation seat and a transmission shaft;
the motor installation seat is provided with an inner cavity as well as a first installation hole and a second installation hole formed in the two ends of the inner cavity respectively;
the motor is installed at the upper part of the motor installation seat and is sealingly connected with the motor installation seat; a motor output shaft of the motor extends into the inner cavity through the first installation hole; and
one end of the transmission shaft extends into the inner cavity through the second installation hole and is drivingly connected with the motor output shaft, a middle part of the transmission shaft and the second installation hole are sealingly connected, and the other end of the transmission shaft extends out of the second installation hole.

According to the above-mentioned power equipment in one aspect of the present invention, preferably, a motor oil drainage cavity of the motor is integrated with the inner cavity of the motor installation seat.

According to the above-mentioned power equipment in one aspect of the present invention, preferably, a first sealing assembly is arranged between the middle part of the transmission shaft and the second installation hole.

According to the above-mentioned power equipment in one aspect of the present invention, preferably, the second installation hole is a step hole;
the first sealing assembly includes a dynamic ring and a static ring, the static ring is fixed on a step in the step hole, the dynamic ring is fixed at the middle part of the transmission shaft, and sealing surfaces mating with each other exist between the dynamic ring and the static ring.

According to the above-mentioned power equipment in one aspect of the present invention, preferably, a first bearing installation seat is arranged in the inner cavity of the motor installation seat, and one end of the transmission shaft is installed in the first bearing installation seat through a first bearing.

According to the above-mentioned power equipment in one aspect of the present invention, preferably, an inner spline is arranged at one end of the transmission shaft, an outer spline is arranged on the motor output shaft, and the inner spline at one end of the transmission shaft engages with the outer spline on the motor output shaft.

According to the above-mentioned power equipment in one aspect of the present invention, preferably, the power equipment further includes a base;
the motor installation seat is provided with an installation plate extending inwards and a side plate extending downwards, and the second installation hole is formed in the installation plate;
the base is provided with a third installation hole, and the other end of the transmission shaft extends below the base through the third installation hole;
the base is arranged below the side plate, and a detection cavity for detecting whether oil leaks is formed among the side plate, the base, the installation plate and the transmission shaft.

According to the above-mentioned power equipment in one aspect of the present invention, preferably, a coding disc is installed on the outer wall of the part, positioned inside the detection cavity, of the transmission shaft, an encoder is installed on the side plate, and the coding disc corresponds to the encoder.

According to the above-mentioned power equipment in one aspect of the present invention, preferably, a second sealing assembly is arranged between the transmission shaft and the third installation hole.

According to the above-mentioned power equipment in one aspect of the present invention, preferably, the power equipment further includes an auxiliary fixing plate;
one end of the auxiliary fixing plate is fixed with the base, a second bearing seat is arranged at the other end of the auxiliary fixing plate, the second bearing seat is positioned in a through hole of the auxiliary fixing plate, and the other end of the transmission shaft extends below the base and is installed in the second bearing seat through a second bearing.

According to another aspect of the present invention, the present invention further provides a driving device of trench cutter, including a decelerator, a driving shaft and the power equipment provided by any technical solution of the present invention;

the first end of the driving shaft is drivingly connected with the other end of the transmission shaft, and the second end of the driving shaft is drivingly connected with a gear shaft of the decelerator.

According to the above-mentioned driving device of trench cutter in another aspect of the present invention, preferably, the driving device of trench cutter further includes an upper connecting shaft;

one end of the upper connecting shaft is drivingly connected with the other end of the transmission shaft, a drum tooth spline is arranged at the other end of the upper connecting shaft, and the drum tooth spline is drivingly connected with the first end of the driving shaft.

According to the above-mentioned driving device of trench cutter in another aspect of the present invention, preferably, an outer spline is arranged at the upper part of the upper connecting shaft, and the drum tooth spline is arranged at the lower part thereof;

an inner spline is arranged at the other end of the transmission shaft, and an inner spline is arranged at the first end of the driving shaft;

the outer spline of the upper connecting shaft engages with the inner spline at the other end of the transmission shaft, and the drum tooth spline of the upper connecting shaft engages with the inner spline at the first end of the driving shaft.

According to the above-mentioned driving device of trench cutter in another aspect of the present invention, preferably, an blind hole is formed in the first end of the driving shaft, and the inner spline at the first end of the driving shaft is formed on the inner wall of the blind hole.

According to the above-mentioned driving device of trench cutter in another aspect of the present invention, preferably, at least one bolt is coaxially arranged on the upper connecting shaft, and the engaging position of the drum tooth spline of the upper connecting shaft and the inner spline at the first end of the driving shaft is adapted to be changed by adjusting the screw-in depth of the bolt on the upper connecting shaft.

According to the above-mentioned driving device of trench cutter in another aspect of the present invention, preferably, the bolt head of the bolt is positioned in the blind hole, and an elastic element is arranged between the bolt head and the bottom surface of the blind hole.

According to the above-mentioned driving device of trench cutter in another aspect of the present invention, preferably, the driving device of trench cutter further includes a power equipment installation seat and a support frame;

the power equipment is fixed on the power equipment installation seat, and the power equipment installation seat is fixed at the upper part of the support frame;
the driving shaft passes through a through hole of the support frame.

According to the above-mentioned driving device of trench cutter in another aspect of the present invention, preferably, the driving device of trench cutter further includes a support plate;

the support plate is fixed below the support frame, and the driving shaft passes through a through hole of the support plate.

According to the above-mentioned driving device of trench cutter in another aspect of the present invention, preferably, the driving device of trench cutter further includes a drum block and a lower connecting shaft;

the second end of the driving shaft is drivingly connected with the drum block, the drum block is drivingly connected with the lower connecting shaft through the drum tooth spline, and the lower connecting shaft is drivingly connected with the gear shaft.

According to the above-mentioned driving device of trench cutter in another aspect of the present invention, preferably, the drum block is provided with an inner spline and a drum tooth spline; an outer spline is arranged at the second end of the driving shaft; an inner spline is arranged at one end of the lower connecting shaft, and an outer spline is arranged at the other end thereof;

an inner spline is arranged on the gear shaft;

the outer spline at the second end of the driving shaft engages with the inner spline of the drum block, the drum tooth spline of the drum block engages with the inner spline of the lower connecting shaft, and the outer spline of the lower connecting shaft is engages with the inner spline of the gear shaft.

According to the above-mentioned driving device of trench cutter in another aspect of the present invention, preferably, the lower connecting shaft is provided with a first connecting part and a second connecting part which are formed fixedly, a sunken groove is formed in the first connecting part, and the inner spline of the lower connecting shaft is arranged on the inner wall of the sunken groove;

the outer spline of the lower connecting shaft is arranged on the second connecting part.

According to the above-mentioned driving device of trench cutter in another aspect of the present invention, preferably, the driving device of trench cutter further includes a fixed block;

the fixed block is provided with a through hole, and the first connecting part is sleeved inside the through hole of the fixed block;

at least one spiral strip is arranged outside the first connecting part; a clearance is formed between the spiral strip and the through hole of the fixed block;

wherein, the spiral direction of the spiral strip is opposite to the rotating direction of the driving shaft.

According to the above-mentioned driving device of trench cutter in another aspect of the present invention, preferably, the driving device of trench cutter further includes a sleeve;

the sleeve is fixed above the support frame and sleeved outside the first end of the driving shaft, and is higher than the sealing surface of the second sealing assembly on the power equipment;

the through hole of the support frame is positioned between the sleeve and the outer wall of the first end of the driving shaft.

According to the above-mentioned driving device of trench cutter in another aspect of the present invention, preferably, a through oil return hole is provided on the support frame and the support plate;

one end of the oil return hole of the support frame is positioned between the outer wall of the sleeve and the inner wall of the power equipment installation seat; and one end of the oil return hole of the support plate is communicated with a gear box of the decelerator.

According to the above-mentioned driving device of trench cutter in another aspect of the present invention, preferably, a circulating hole is further formed in the first end of the driving shaft, one end of the circulating hole is communicated with the blind hole, and the other end of the circulating hole is positioned inside the sleeve.

According to the above-mentioned driving device of trench cutter in another aspect of the present invention, preferably, the driving device of trench cutter further includes magnetic adsorption equipment;

the magnetic adsorption equipment is arranged on the support frame and positioned between the outer wall of the sleeve and the inner wall of the power equipment installation seat.

According to the above-mentioned driving device of trench cutter in another aspect of the present invention, preferably, the bottom surface of the sunken groove is a spherical convex surface, and the bottom surface of the drum block contacts with the spherical convex surface.

According to a further aspect of the present invention, the present invention further provides a trench cutter, including the driving device of trench cutter provided by any technical solution of the present invention.

On the basis of the above-mentioned technical solutions, the embodiments of the present invention at least can achieve the following technical effects:

in the above-mentioned technical solutions, a motor oil drainage cavity can be sealed by sealing the newly added motor installation seat, without complex structural improvement on the motor, so that the sealing effect and the pressure bearing capacity of the whole power equipment can be ensured, and the whole power equipment is reliable in operation, convenient to maintain and low in cost and therefore is favorable for the popularization and application of the trench cutter.

Marks in the drawings are respectively as follows:

| | |
|---|---|
| 1-motor; | 2-motor installation seat; |
| 3-base; | 4-power equipment installation seat; |
| 5-first sealing assembly; | 6-transmission shaft; |
| 7-coding disc; | 8-second sealing assembly; |
| 9-sleeve; | 10-upper connecting shaft; |
| 11-magnet; | 12-driving shaft; |
| 13-elastic element; | 14-support frame; |
| 15-support plate; | 16-drum block; |
| 17-fixed block; | 18-lower connecting shaft; |
| 19-gear shaft; | 21, 22-bolt; |
| 23-auxiliary fixing plate; | 24-first installation hole; |
| 25-second installation hole; | 30-oil return hole; |
| 31-first bearing installation seat; | 32-second bearing; |
| 33-end cover; | 34-first bearing; |
| 40-third sealing element; | 50-encoder; |
| 51-dynamic ring; | 52-static ring; |
| 60-stop valve; | 62-inner spline; |
| 70-motor output shaft; | 71-outer spline; |
| 61-inner spline; | 101-outer spline; |
| 102-drum tooth spline; | 121-inner spline; |
| 122-outer spline; | 123-circulating hole; |
| 161-drum tooth spline; | 162-inner spline; |
| 181-spherical convex surface; | 182-spiral strip; |
| 183-outer spline; | 184-inner spline; |
| 191-inner spline; | 201-oil drainage hole. |

DETAILED DESCRIPTION OF THE INVENTION

The technical solutions provided by the present invention will be described in more detail below in combination with FIG. 2 to FIG. 8, and the technical solutions obtained by substituting any technical means provided by the present invention or combining any two or more technical means or technical features provided by the present invention shall fall into the protection scope of the present invention.

Embodiment 1

Figure 2:
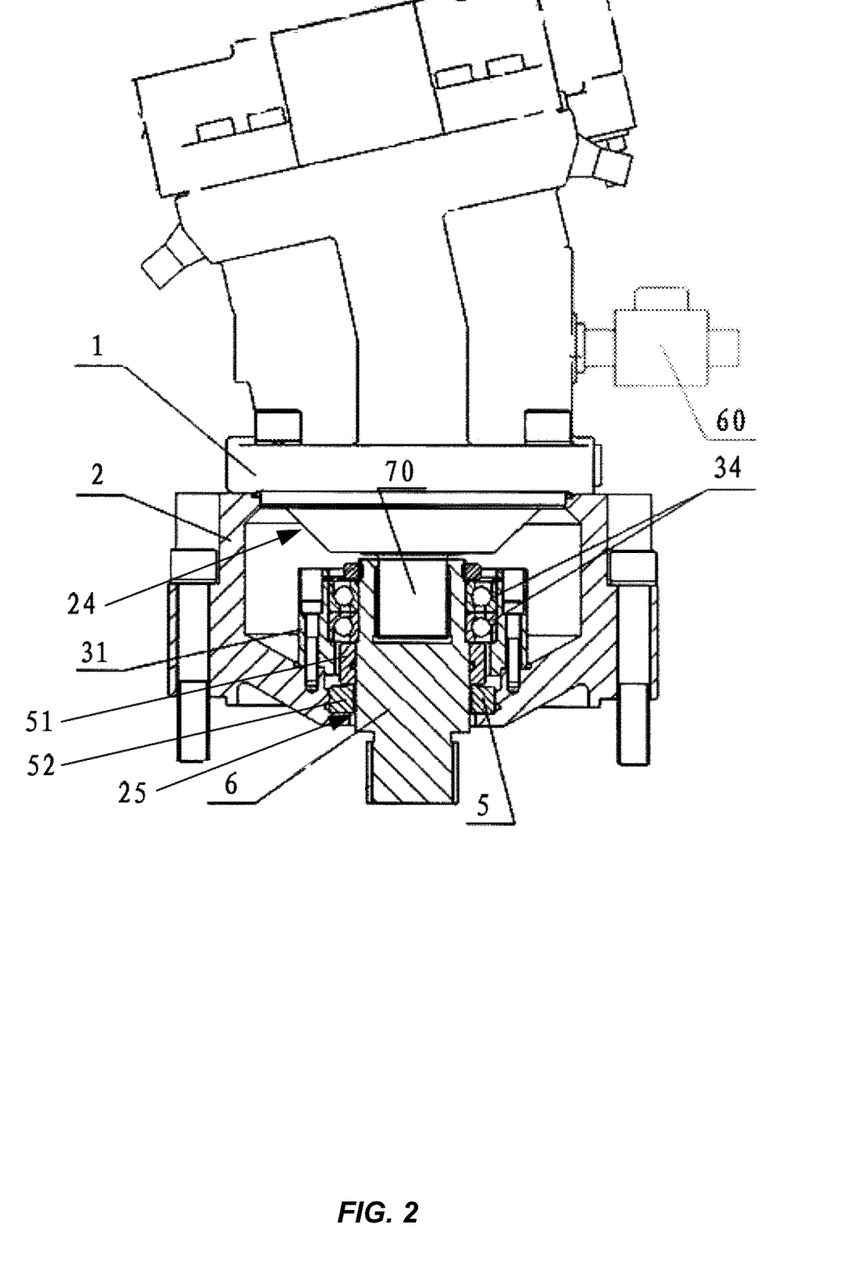
FIG. 2 is a structural schematic diagram of power equipment provided by embodiment 1 of the present invention.

See FIG. 2. The embodiment of the present invention provides power equipment, including a motor 1, a motor installation seat 2 and a transmission shaft 6. The motor installation seat 2 is provided with an inner cavity as well as a first installation hole 24 and a second installation hole 25 formed in the two ends of the inner cavity respectively. The motor 1 is installed at the upper part of the motor installation seat 2 and is sealingly connected with the motor installation seat 2, and specifically, the shell of the motor 1 is sealingly connected with the motor installation seat 2. A motor output shaft 70 of the motor 1 extends into the inner cavity through the first installation hole 24. One end of the transmission shaft 6 extends into the inner cavity through the second installation hole 25 and is drivingly connected with the motor output shaft 70, a middle part of the transmission shaft 6 and the second installation hole 25 are sealingly connected, and the other end of the transmission shaft 6 extends out of the second installation hole 25.

The motor used in this embodiment is the one without a lip seal, and can be obtained by purchasing the existing common motor and then detaching the lip seal from the motor.

A simpler manner of the motor installation seat 2 is to adopt a revolved body structure.

The motor 1 is installed at the upper part of the motor installation seat 2 and is connected with the motor installation seat 2 in the sealed mode. The motor output shaft 70 extends into the inner cavity of the motor installation seat 2. The motor 1 is connected with the motor installation seat 2 in the sealed mode, actually to realize sealed connection between a motor oil drainage cavity and the inner cavity of the motor installation seat 2. As the inner cavity of the motor installation seat 2 is provided with two installation holes: the first installation hole 24 and the second installation hole 25, the sealed connection between the motor 1 and the motor installation seat 2 realizes sealing of the first installation hole 24. The second installation hole 25 in the motor installation seat 2 is sealed by sealing between the transmission shaft 6 and the inner wall of the second installation hole 25. Thus, a motor oil drainage cavity is integrated with the inner cavity of the motor installation seat 2. As long as the inner cavity of the motor installation seat 2 is sealed, oil in the motor oil drainage cavity can be prevented from leaking.

Hence, the above-mentioned technical solution provided by the present invention is substantially different from the solution of directly realizing sealing of the motor oil drainage cavity in the prior art. In the technical solution provided by the present application, the motor oil drainage cavity can be sealed by sealing the newly added motor installation seat 2, without complex structural improvement on the motor 1, so that the sealing effect and the pressure bearing capacity of the whole power equipment can be ensured, and the whole power equipment is reliable in operation, convenient to maintain and low in cost and therefore is favorable for the popularization and application of a trench cutter.

Further, the transmission shaft 6 and the second installation hole 25 realize sealing in the following manner: a first sealing assembly 5 is arranged between the middle part of the transmission shaft 6 and the second installation hole 25. The first sealing assembly 5 may adopt mechanical sealing, brush sealing, honeycomb sealing, labyrinth sealing or the like. One of the optional implementations is specifically as follows:

the second installation hole 25 is a step hole. The first sealing assembly 5 includes a dynamic ring 51 and a static ring 52, the static ring 52 is fixed on a step in the step hole, the dynamic ring 51 is fixed at the middle part of the transmission shaft 6, and sealing surfaces mating with each other exist between the dynamic ring 51 and the static ring 52. Sealing between the moving component (transmission shaft 6) and the static component (motor installation seat 2) is realized by the mating of the sealing surfaces of the dynamic ring 51 and the static ring 52.

In order to ensure the position reliability of the transmission shaft 6 in the inner cavity of the motor installation seat 2, specifically, a first bearing installation seat 31 is further arranged in the inner cavity of the motor installation seat 2, and one end of the transmission shaft 6 is installed in the first bearing installation seat 31 through a first bearing 34.

The transmission shaft 6 and the motor output shaft 70 can realize driving connection by adopting spline connection: an inner spline 61 is arranged at one end of the transmission shaft 6, an outer spline 71 is arranged on the motor output shaft 70, and the inner spline 61 at one end of the transmission shaft 6 engages with the outer spline 71 on the motor output shaft 70. For the setting positions of the inner spline 61 and the outer spline 71, reference may be made to FIG. 3.

Figure 3:
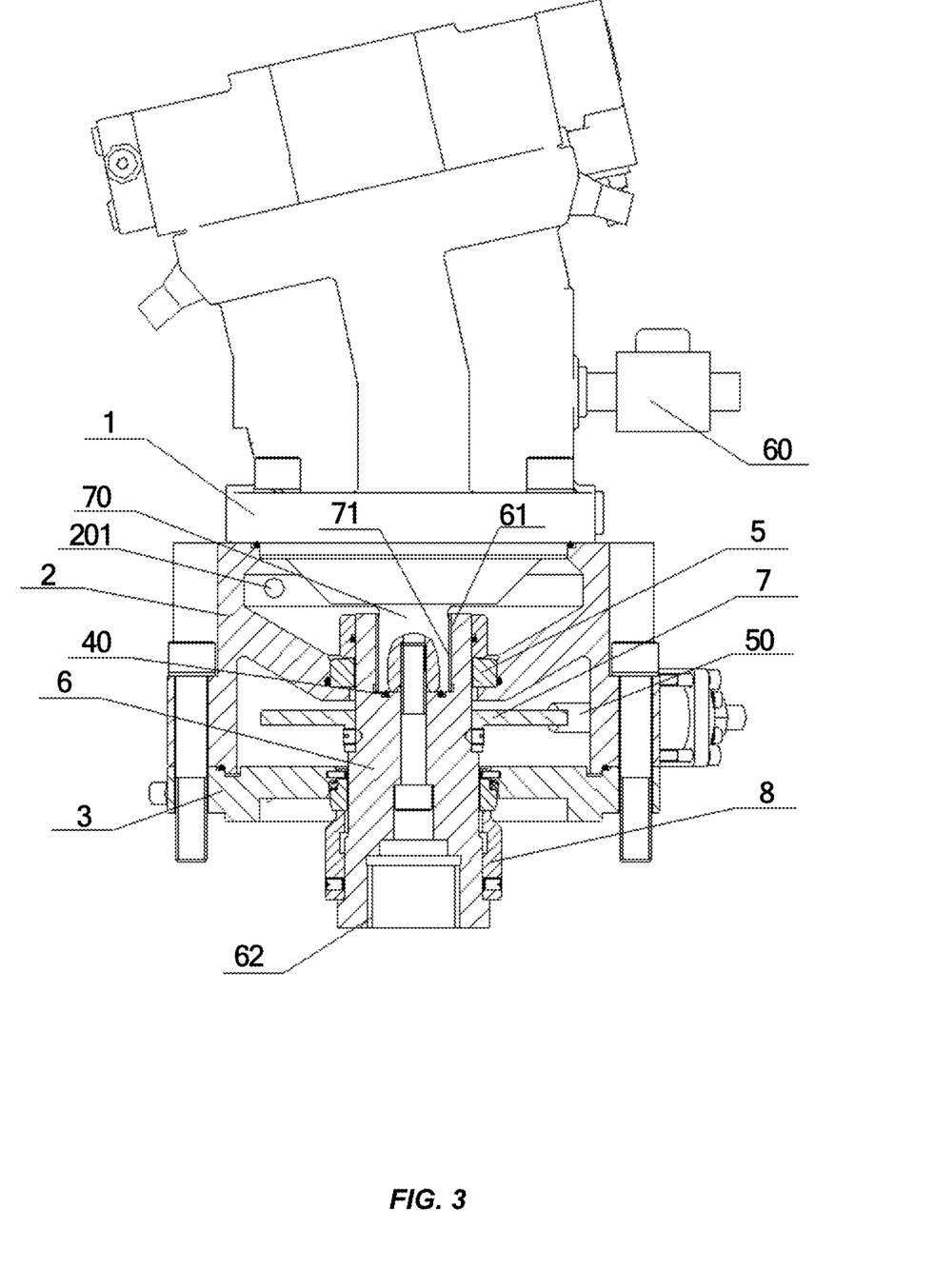
FIG. 3 is a structural schematic diagram of power equipment provided by embodiment 2 of the present invention.

The rotation of the motor output shaft 70 can drive the transmission shaft 6 to rotate synchronously.

See FIG. 2. The power equipment provided by the embodiment of the present invention includes the motor 1, the motor installation seat 2, the first bearing installation seat 31, the transmission shaft 6, the first sealing assembly 5 and the like. The motor 1 is installed on the motor installation seat 2, the first bearing installation seat 31 is coaxially installed inside the motor installation seat 2, at least one first bearing 34 is installed in the first bearing installation seat 31, the transmission shaft 6 is installed in the first bearing installation seat 31 through the first bearing 34 and is connected with the motor output shaft 70 in a non-rotatable manner, and the first sealing assembly 5 is installed between the motor installation seat 2 and the transmission shaft 6 and is positioned below the first bearing 34.

Embodiment 2

See FIG. 3. On the basis of the technical solution of the above-mentioned embodiment, in the technical solution of this embodiment, preferably, the power equipment further includes a base 3. The motor installation seat 2 is provided with an installation plate extending inwards and a side plate extending downwards, and the second installation hole 25 is formed in the installation plate. The base 3 is provided with a third installation hole, and the other end of the transmission shaft 6 extends below the base 3 through the third installation hole. The base 3 is arranged below the side plate, and a sealed detection cavity is formed among the side plate, the base 3, the installation plate and the transmission shaft 6. The sealing effect of the first sealing assembly 5 and a second sealing assembly 8 below can be judged by detecting whether the detection cavity has oil.

Further, the revolving speed of the motor 1 can also be measured by using the detection cavity: a coding disc 7 is installed on the outer wall of the part, positioned inside the detection cavity, of the transmission shaft 6, an encoder 50 is installed on the side plate, and the coding disc 7 corresponds to the encoder 50. Since the motor output shaft 70 and the transmission shaft 6 rotate synchronously, the revolving speed of the motor output shaft 70 can be measured by detecting the revolving speed of the transmission shaft 6.

See FIG. 3. A second sealing assembly 8 may further be arranged between the transmission shaft 6 and the third installation hole. The second sealing assembly 8 may also be realized in the same manner as the first sealing assembly 5: mechanical sealing, brush sealing, graphite sealing, honeycomb sealing, fingertip sealing or combined sealing of two above sealing manners, or other forms. The second sealing assembly 8 is positioned below the detection cavity, the first sealing assembly 5 is positioned above the detection cavity, and oil can be prevented from permeating into the detection cavity from the upper part and the lower part of the detection cavity through the first sealing assembly 5 and the second sealing assembly 8.

The technical solution of this embodiment will be further introduced in detail below in combination with FIG. 3.

The power equipment includes the motor 1, the motor installation seat 2, the base 3, the transmission shaft 6, the first sealing assembly 5, the second sealing assembly 8 and the like. The motor 1 is installed at the upper end of the motor installation seat 2, the base 3 is arranged at the lower end of the motor installation seat 2, the transmission shaft 6 is installed on the motor output shaft 70 in a non-rotatable manner, the first sealing assembly 5 is installed between the motor installation seat 2 and the transmission shaft 6, and the second sealing assembly 8 is installed between the base 3 and the transmission shaft 6; and a third sealing element 40 is installed between the transmission shaft 6 and the motor output shaft 70.

Preferably, the first sealing assembly 5 and the second sealing assembly 8 are mechanical seals, and the third sealing element 40 is an O-shaped ring.

A first sealed cavity, i.e., the inner cavity of the motor installation seat 2, communicated with the motor oil drainage cavity, is formed through the motor 1, the motor installation seat 2, the transmission shaft 6 and the first sealing assembly 5. The third sealing element 40 prevents hydraulic oil in the motor oil drainage cavity from flowing out from a bolt hole in the middle of the transmission shaft 6.

A second sealed cavity, i.e., the detection cavity, is formed through the motor installation seat 2, the base 3, the transmission shaft 6, the first sealing assembly 5 and the second sealing assembly 8. The first sealing assembly 5 can prevent hydraulic oil from entering the detection cavity; and the second sealing assembly 8 can prevent matters outside the base 3 from entering the detection cavity.

A detection hole connected with the outside can be formed in the base 3 or the lower end of the motor installation seat 2, and the detection hole is used for detecting whether oil enters the second sealed cavity, so as to judge whether the first sealing assembly 5 or the second sealing assembly 8 is damaged.

The coding disc 7 is installed in the area of the detection cavity on the transmission shaft 6, the coding disc 7 cannot rotate relative to the transmission shaft 6, the encoder 50 at the same horizontal position as the coding disc 7 is further installed on the side plate of the motor installation seat 2, and the encoder 50 is used for detecting the output revolving speed of the motor 1.

The above-mentioned motor 1 is a common hydraulic motor, and no sealing element is at the motor output shaft 70 thereof. A stop valve 60, specifically a spherical valve, is connected to the oil drainage port of the motor, and the stop valve 60 is used for cutting off the oil passage when the motor 1 is detached, to prevent more hydraulic oil from losing.

An oil drainage hole 201 communicated with the outside is formed in the cavity of the motor installation seat 2, and the oil drainage hole 201 is usually in a closed state and is used for draining hydraulic oil in the cavity of the motor installation seat 2 when the motor 1 is detached.

Embodiment 3

Figure 4:
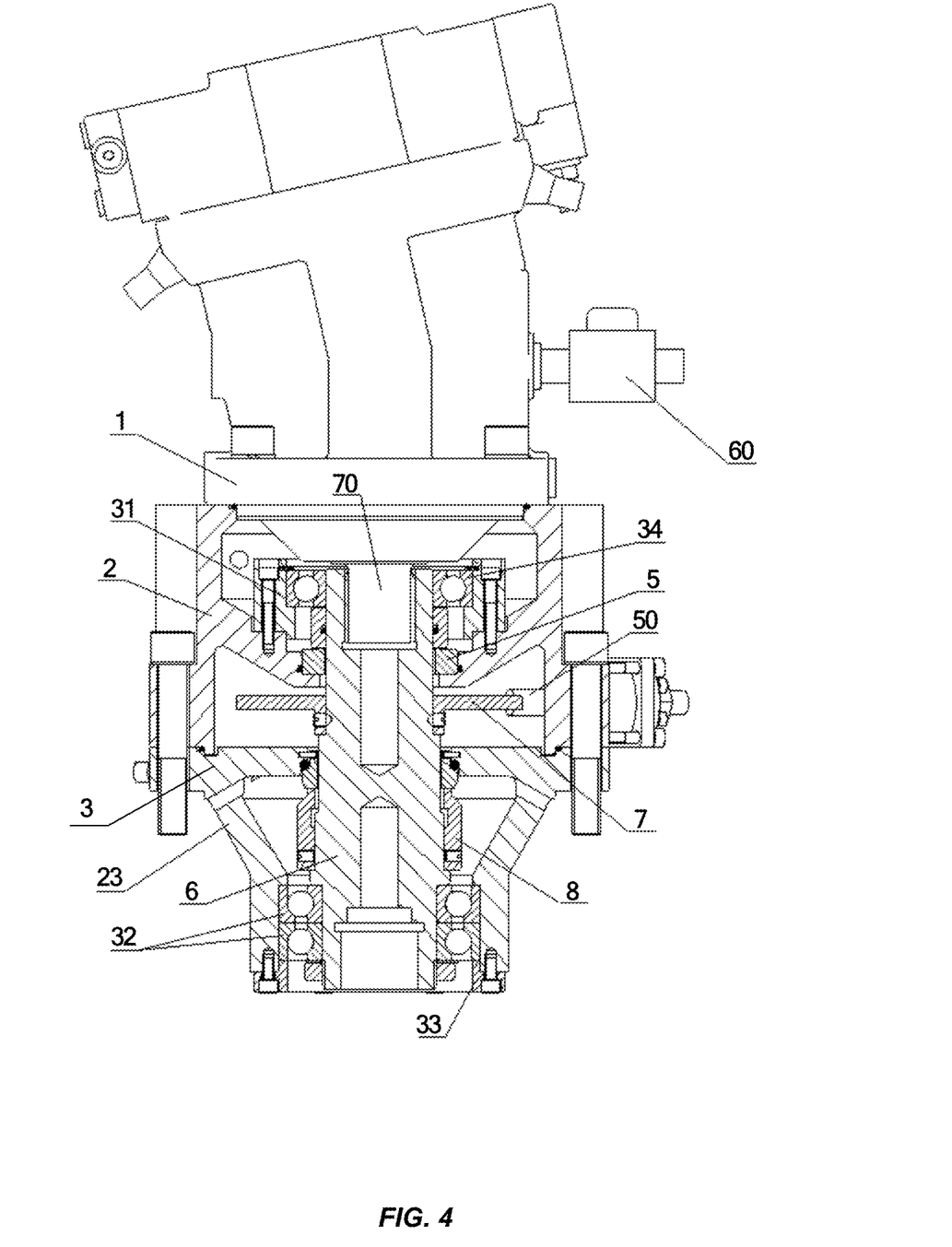
FIG. 4 is a structural schematic diagram of power equipment provided by embodiment 3 of the present invention.

See FIG. 4. On the basis of the technical solution of embodiment 2, in this embodiment, preferably, the power equipment further includes an auxiliary fixing plate 23. The auxiliary fixing plate 23 is provided with a through hole, one end of the auxiliary fixing plate 23 is fixed with the base 3, a second bearing seat is arranged at the other end of the auxiliary fixing plate 23, and the other end of the transmission shaft 6 extends below the base 3 and is installed in the second bearing seat through a second bearing 32. An end cover 33 is arranged below the second bearing 32.

The second bearing seat can be arranged through the auxiliary fixing plate 23 to support the transmission shaft 6. Then, two bearing installation seats are arranged at the upper and lower ends of the whole transmission shaft 6, so that transmission of the transmission shaft 6 is more stable.

The technical solution provided by this embodiment will be further introduced in detail below in combination with FIG. 4.

A bearing supporting structure is added in this embodiment, and the power equipment includes the first bearing 34, the first bearing installation seat 31 and the second bearing 32; the transmission shaft 6 is supported by the first bearing 34 and the second bearing 32, the first bearing installation seat 31 is installed on the motor installation seat 2, and the first bearing 34 is installed in the first bearing installation seat 31 and is positioned above the first sealing assembly 5. The second bearing 32 is installed in the base 3 and is positioned below the second sealing assembly 8. By adding the supporting bearings, the rigidity of the transmission shaft 6 is greatly increased, each sealing assembly is effectively prevented from being shocked, and the service lives of the sealing assemblies are prolonged. A structure connected with the outside is machined at the other end of the transmission shaft 6, and will be described in detail below.

Embodiment 4

See FIG. 5 to FIG. 8. Embodiment 4 of the present invention provides a driving device of trench cutter, including a decelerator, a driving shaft 12 and the power equipment provided by any technical solution of the above-mentioned embodiments of the present invention. The first end of the driving shaft 12 is drivingly connected with the other end of the transmission shaft 6, and the second end of the driving shaft 12 is drivingly connected with a gear shaft of the decelerator.

Figure 5:
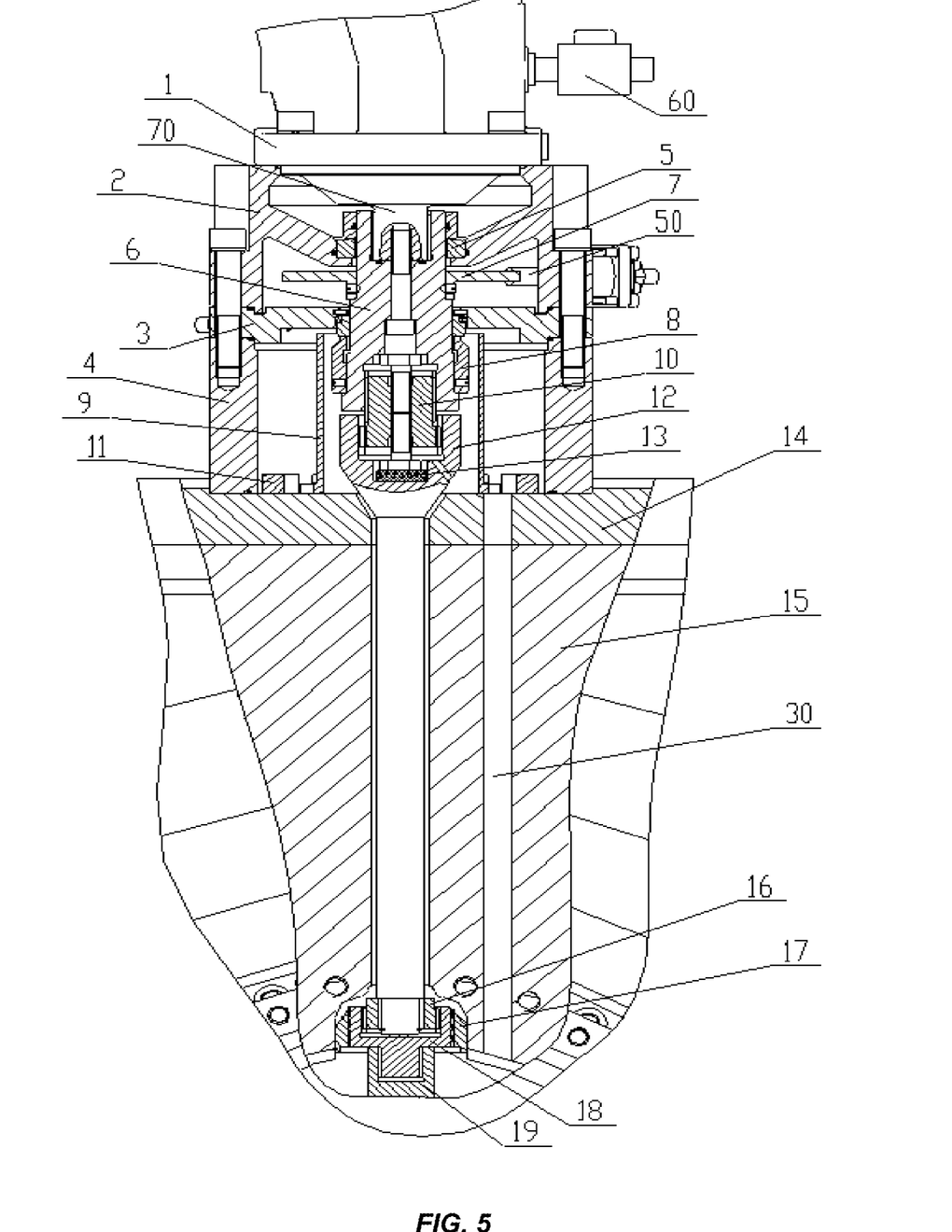
FIG. 5 is a schematic diagram of a local profile structure of a driving device of trench cutter provided by embodiment 4 of the present invention.

Further, the driving device of trench cutter further includes an upper connecting shaft 10; one end of the upper connecting shaft 10 is drivingly connected with the other end of the transmission shaft 6, a drum tooth spline 102 is arranged at the other end of the upper connecting shaft 10, and the drum tooth spline 102 is drivingly connected with the first end of the driving shaft 12.

The drum tooth spline 102 is arranged on the upper connecting shaft 10, to avoid arranging a drum tooth structure at the first end of the driving shaft 12. On the one hand, the installation requirement for the coaxiality between the driving shaft 12 and the transmission shaft 6 can be reduced; and on the other hand, when the drum tooth spline 102 is worn, the upper connecting shaft 10 can be directly replaced, and the transmission shaft 6 and the driving shaft 12 do not need to be replaced, so that the replacement cost can be lowered, the problem of short service life of the driving shaft 12 due to the abrasion of the drum tooth spline 102 is reduced and even avoided, and the service life of the driving shaft 12 can be prolonged to more than three times.

Specifically, driving connection is realized between the upper connecting shaft 10 and the transmission shaft 6 and between the upper connecting shaft 10 and the driving shaft 12 in the following manner: an outer spline 101 is arranged at the upper part of the upper connecting shaft 10, and the drum tooth spline 102 is arranged at the lower part of the upper connecting shaft 10. An inner spline 62 is arranged at the other end of the transmission shaft 6, and an inner spline 121 is arranged at the first end of the driving shaft 12. The outer spline 101 at the upper end of the upper connecting shaft 10 engages with the inner spline 62 at the other end of the transmission shaft 6, and the drum tooth spline 102 at the lower end of the upper connecting shaft 10 engages with the inner spline 121 at the first end of the driving shaft 12.

To enable the structure to be more compact, an blind hole is formed in the first end of the driving shaft 12, and the inner spline 121 at the first end of the driving shaft 12 is formed on the inner wall of the blind hole.

At least one bolt or screw is coaxially arranged on the upper connecting shaft 10, preferably, two reverse bolts 21 and 22 or screws are coaxially arranged on the upper connecting shaft 10, and the engaging position of the drum tooth spline 102 with the inner spline 121 is adapted to be changed by adjusting the screw-in depth of the two bolts or screws on the upper connecting shaft 10. Thus, the service life of the driving shaft 12 can be prolonged. Moreover, by adjusting the screw-in depth of the bolts 21 and 22 or screws, the dimensional requirement of the axial transmission direction of the driving device can be easily met, and the axial machining precision of each component is reduced.

Herein, the bolt head of the bolt on the upper connecting shaft 10 is positioned in the blind hole, and an elastic element 13 is arranged between the bolt head and the bottom surface of the blind hole. The elastic element 13 may be a rubber block, a spring cushion or the like. The elastic element 13 ensures certain axial pre-tightening force of the driving device, but does not define installation deviation of the driving shaft 12 due to machining errors.

In order to conveniently install the power equipment, the driving device of trench cutter further includes a power equipment installation seat 4 and a support frame 14. The above-mentioned power equipment is fixed on the power equipment installation seat 4. Specifically, the power equipment installation seat 4 is fixed at the upper part of the support frame 14 through bolts; and the driving shaft 12 passes through a through hole of the support frame 14.

A sunken groove may be further formed in the support frame 14, to limit the position of the power equipment installation seat 4 on the support frame 14, and the driving shaft 12 extends downwards through the support frame 14 and is connected with the gear shaft 19 of the decelerator.

Further, the driving device of trench cutter further includes a support plate 15; the support plate 15 is fixed below the support frame 14; and the driving shaft 12 passes through the through hole of the support frame 14, then continuously passes through a through hole of the support plate 15, and is connected with the gear shaft 19 of the decelerator. The support plate 15 plays a role in supporting and limiting the driving shaft 12.

Figure 7:
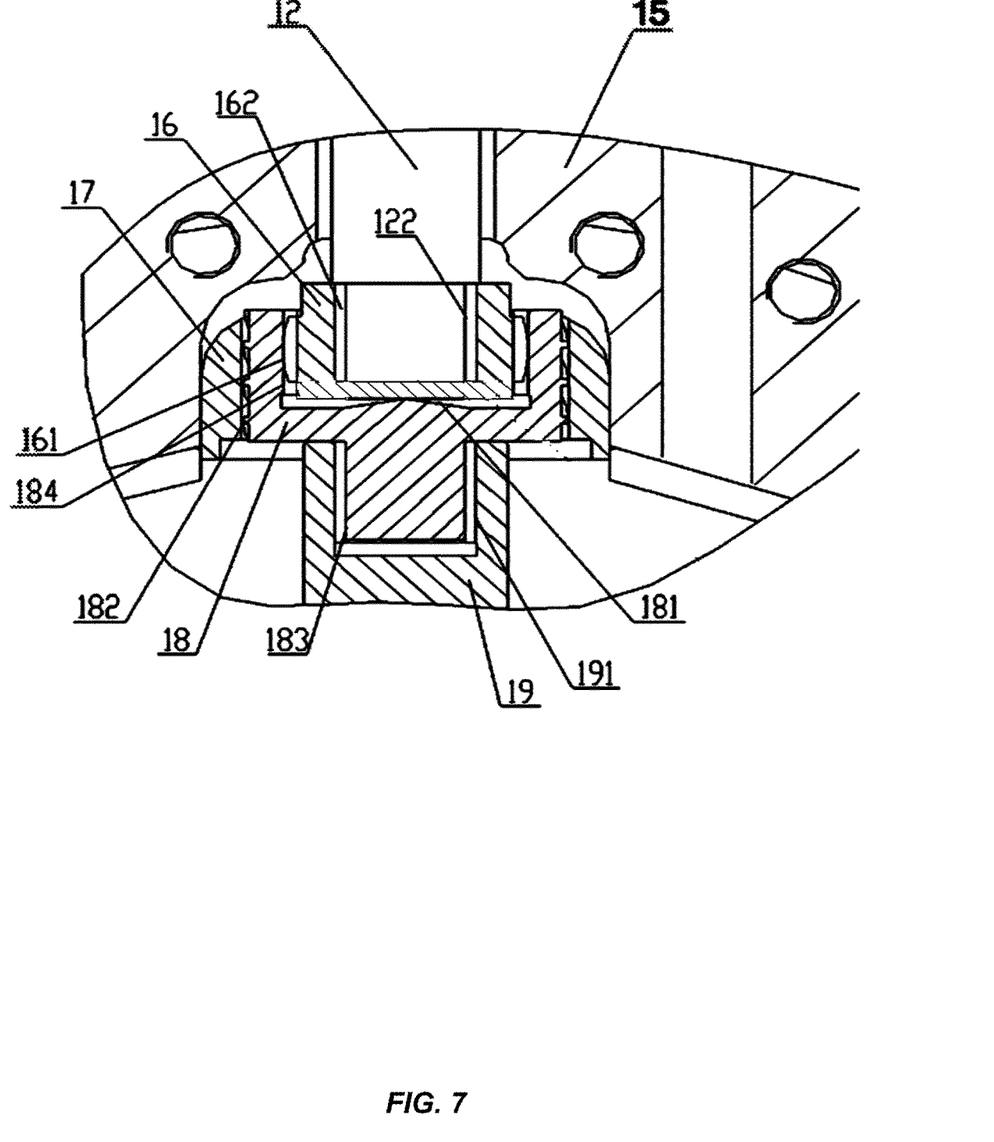
FIG. 7 is an amplified schematic diagram of the second end of the driving shaft in FIG. 5.

See FIG. 7. Because the second end of the driving shaft 12 is also drivingly connected with the gear shaft 19 of the decelerator, the coaxiality is also required. In order to reduce the installation requirement for the coaxiality between the driving shaft 12 and the gear shaft 19, the second end of the driving shaft 12 can be connected with the gear shaft 19 of the decelerator in the following manner: the driving device of trench cutter further includes a drum block 16 and a lower connecting shaft 18; the second end of the driving shaft 12 is drivingly connected with the drum block 16, the drum block 16 is drivingly connected with the lower connecting shaft 18 through a drum tooth spline, and the lower connecting shaft 18 is drivingly connected with the gear shaft 19. The drum block 16 is drivingly connected with the lower connecting shaft 18 through the drum tooth spline; and the drum tooth spline may be arranged on the drum block 16 or the lower connecting shaft 18, and is arranged on the drum block 16 as an example in this embodiment.

Herein, the drum tooth spline is arranged on the drum block 16, thus a drum tooth spline arranged at the second end of the driving shaft 12 or on the gear shaft 19 of the decelerator is avoided. The drum tooth spline is a component easy to wear, and when the drum tooth spline is worn, the drum block 16 can be directly replaced, and the driving shaft 12 and the gear shaft 19 do not need to be replaced, so that the replacement cost can be lowered, and the service life of the driving shaft 12 can be prolonged.

Specifically, the drum block 16 is simultaneously provided with the inner spline and the drum tooth spline; an outer spline is arranged at the second end of the driving shaft 12; an inner spline is arranged at one end of the lower connecting shaft 18, and an outer spline is arranged at the other end of the lower connecting shaft 18; an inner spline is arranged on the gear shaft 19. The outer spline at the second end of the driving shaft 12 engages with the inner spline of the drum block 16, the drum tooth spline of the drum block 16 engages with the inner spline of the lower connecting shaft 18, and the outer spline of the lower connecting shaft 18 engages with the inner spline of the gear shaft 19.

One end of the lower connecting shaft 18 is connected with the drum tooth spline, and the other end is connected with the gear shaft 19 of the decelerator. In order to conveniently arrange the splines engaging with the drum tooth spline and the gear shaft respectively, alternatively, the lower connecting shaft 18 adopts the following structure: the lower connecting shaft 18 is provided with a first connecting part and a second connecting part which are formed fixedly, a sunken groove is formed in the first connecting part, and the inner spline of the lower connecting shaft 18 is arranged on the inner wall of the sunken groove. The outer spline of the lower connecting shaft 18 is arranged on the second connecting part. The outside diameter of the first connecting part can be greater than that of the second connecting part.

Figure 8:
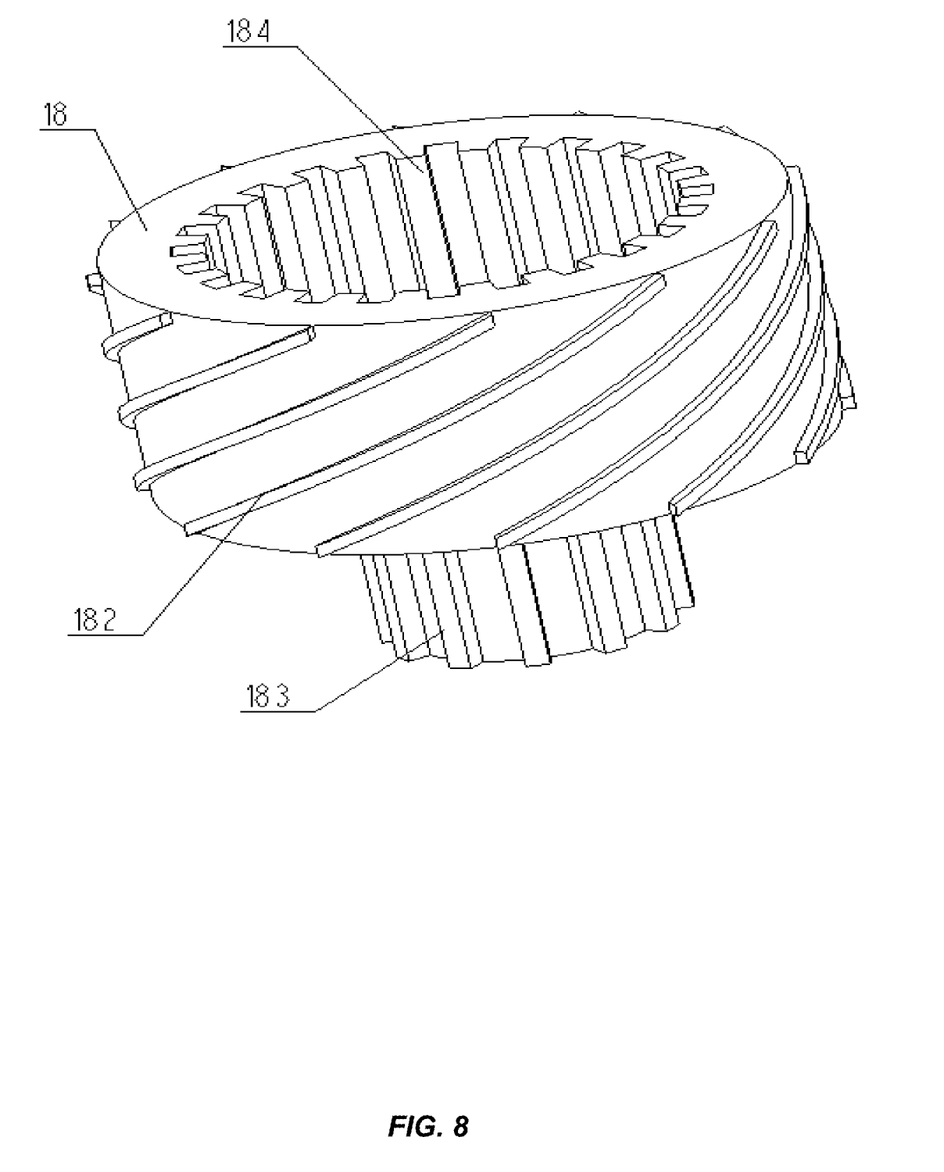
FIG. 8 is a three-dimensional schematic diagram of a lower connecting shaft in FIG. 5.

See FIG. 7 and FIG. 8. The driving device of trench cutter further includes a fixed block 17; the fixed block 17 is provided with a through hole, and the first connecting part of the lower connecting shaft 18 is sleeved inside the through hole of the fixed block 17. At least one spiral strip 182 is arranged at the outer part of the first connecting part, i.e., on the outer circumference; and a clearance is formed between the spiral strip 182 and the inner wall of the through hole of the fixed block 17. Wherein, the spiral direction of the spiral strip 182 is opposite to the rotating direction of the driving shaft 12, and the rotating direction is the one when the driving shaft 12 drives the decelerator.

During working, the spiral strip 182 continuously delivers oil in a gear box, so that the oil flows up to the first end of the driving shaft 12 along the through hole of the support plate 15 and the through hole of the support frame 14, and the oil in the decelerator lubricates the middle upper part of the driving shaft 12.

See FIG. 5. The driving device of trench cutter further includes a sleeve 9; the sleeve 9 is fixed above the support frame 14 and sleeved outside the first end of the driving shaft 12, and is higher than the sealing surface of the second sealing assembly 8 on the power equipment. The through hole of the support frame 14 is positioned between the sleeve 9 and the outer wall of the first end of the driving shaft 12. The oil in the clearance can flow up to the through hole of the support plate 15 and the through hole of the support frame 14, continuously flows to the space between the sleeve 9 and the outer wall of the first end of the driving shaft 12, and can permeate into the blind hole at the first end of the driving shaft 12, to lubricate each component in the blind hole.

In order to enable the lubricating oil permeating along the clearance from the decelerator to flow back to the decelerator, a through oil return hole 30 is provided on the support frame 14 and the support plate 15. One end of the oil return hole 30 of the support frame 14 is positioned between the outer wall of the sleeve 9 and the inner wall of the power equipment installation seat 4; and one end of the oil return hole 30 of the support plate 15 is communicated with a gear box of the decelerator. After the clearance between the sleeve 9 and the first end of the driving shaft 12 is full of oil, the oil permeates into the space between the sleeve 9 and the inner wall of the power equipment installation seat 4 along the upper edge of the sleeve 9, and then flows back to the decelerator along the oil return hole 30.

Figure 6:
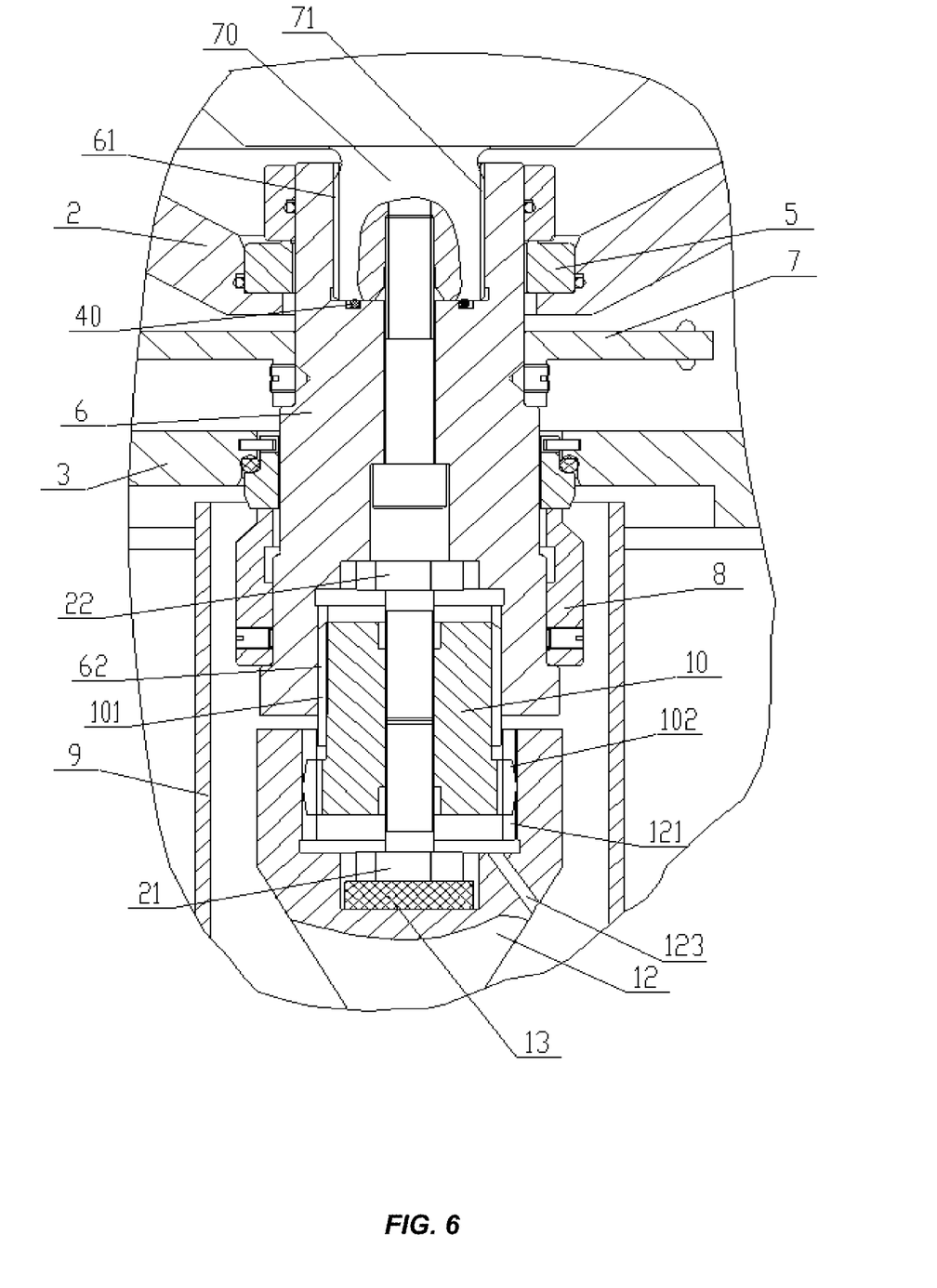
FIG. 6 is an amplified schematic diagram of the first end of a driving shaft in FIG. 5.

See FIG. 6. A circulating hole 123 is further formed in the first end of the driving shaft 12, one end of the circulating hole 123 is communicated with the blind hole, and the other end of the circulating hole 123 is positioned inside the sleeve 9. The components inside the blind hole in the first end of the driving shaft 12 can be lubricated by using the circulating hole 123.

In the working process of the driving device of trench cutter, oil may be doped with metal impurities due to wearing of the components, and the metal impurities may be removed from the lubricating oil in the following manner: the driving device of trench cutter further includes magnetic adsorption equipment; the magnetic adsorption equipment is arranged on the support frame 14 and is positioned between the outer wall of the sleeve 9 and the inner wall of the power equipment installation seat 4. The magnetic adsorption equipment is specifically a magnet 11.

See FIG. 7. The bottom surface of the sunken groove is a spherical convex surface 181, and the bottom surface of the drum block 16 contacts with the spherical convex surface 181, so as to ensure effective supporting the driving shaft 12 when the driving shaft 12 is eccentric or tilts.

The structure of the driving device of trench cutter provided by this embodiment will be further introduced in detail below in combination with FIG. 5 to FIG. 8.

The present invention further provides a driving device of trench cutter, including the upper connecting shaft 10, the driving shaft 12, the lower connecting shaft 18 and the like. The support plate 15 is fixed below the support frame 14, and the power equipment installation seat 4 is fixed above the support frame 14. The driving shaft 12 passes through the through hole of the support frame 14; the first end of the driving shaft 12 is connected with the transmission shaft 6 of the above-mentioned power equipment through the upper connecting shaft 10, and the second end of the driving shaft 12 is connected with the gear shaft 19 in the decelerator through the lower connecting shaft 18, and is specifically connected with an input pinion shaft. The gear shaft 19 and the driving shaft 12 are substantially coaxially installed.

The inner spline 121 is machined at the first end of the driving shaft 12, and the outer spline 122 is machined at the second end of the driving shaft 12.

The drum block 16 is detachably installed at the second end of the driving shaft 12 through the inner spline 162 thereof, and the drum tooth spline 161 is machined outside the drum block 16. Considering that the driving shaft 12 passes through the through hole of the support frame 14, the drum block 16 may adopt a detachable manner, so that on the one hand, the aperture of the through hole in the support frame 14 can be reduced to increase the rigidity of the support frame 14, and on the other hand, the drum tooth spline 161 is easily worn, the detachable drum block 16 can effectively protect the second end of the driving shaft 12 from being worn, and the service life of the driving shaft 12 can be prolonged.

The outer spline 101 is machined at the upper part of the upper connecting shaft 10, and the drum tooth spline 102 is machined at the lower part of the upper connecting shaft 10; the outer spline 101 of the upper connecting shaft 10 engages with the inner spline 62 at the output end of the transmission shaft 6 of the power equipment; and the drum tooth spline 102 of the upper connecting shaft 10 engages with the inner spline 121 at the first end of the driving shaft 12. The outside diameter of the outer spline 101 of the upper connecting shaft 10 is smaller than the inside diameter of the inner spline 121 of the driving shaft 12.

Threaded holes are axially machined in the upper and lower end surfaces of the upper connecting shaft 10, the bolts 21 and 22 are respectively screwed into the upper and lower threaded holes. The engaging position of the drum tooth spline 102 of the upper connecting shaft 10 and the inner spline 121 at the first end of the driving shaft 12 is adjusted by vertically adjusting the screw-in depths of the bolts under the condition that the axial distance of the upper and lower bolts 21 and 22 is unchanged, so that the service life of the inner spline 121 at the first end of the driving shaft 12 can be effectively prolonged.

As shown in FIG. 8, the inner spline 184 is machined at the first connecting part of the lower connecting shaft 18, and the outer spline 183 is machined at the second connecting part of the lower connecting shaft 18.

The second end of the driving shaft 12 engages with the inner spline 184 of the lower connecting shaft 18 through the drum tooth spline 161 of the drum block 16; and the outer spline 183 of the lower connecting shaft 18 engages with the inner spline 191 on the gear shaft 19.

See FIG. 7. The spherical convex surface 181 is formed in the center of the bottom surface of the sunken groove where the inner spline 184 of the lower connecting shaft 18 is located, and the bottom surface of the drum block contacts with the spherical convex surface 181.

See FIG. 6. The elastic element 13 is arranged between the bottom surface of the inner spline 121 at the first end of the driving shaft 12 and the bolt 21 at the lower end of the upper connecting shaft 10. The elastic element 13 can axially limit the displacement of the driving shaft 12, and does not influence the deflection performance of the driving shaft 12. Meanwhile, the axial force applied to the driving shaft 12 by the elastic element 13 can be conveniently adjusted by adjusting the axial distance of the upper and lower bolts 21 and 22 of the upper connecting shaft 10, so that the axial machining precision of each driving element is greatly lowered.

As shown in FIG. 5 and FIG. 6, the driving device of trench cutter further includes a sleeve 9, the sleeve 9 and the driving shaft 12 are coaxially installed on the support frame 14, the sleeve 9 is positioned inside the power equipment installation seat 4, and the height of the sleeve 9 at least exceeds the relative moving surface of the second sealing assembly 8 of the power equipment, i.e., the sealing surface.

The oil return hole 30 is further machined in the support frame 14 and the support plate 15, one end of the oil return hole 30 is positioned between the sleeve 9 and the power equipment installation seat 4, and the other end of the oil return hole 30 is connected to the decelerator.

See FIG. 8. At least one spiral strip 182 is machined on the outer circumferential surface of the inner spline 8 of the lower connecting shaft 18, and the spiral direction of the spiral strip 182 is opposite to the rotating direction of the driving shaft 12 when the driving shaft 12 drives a milling wheel to carry out milling operation.

As shown in FIG. 5 and FIG. 7, the driving device of trench cutter of the present invention further includes a fixed block 17. The fixed block 17 is installed on the support plate 15 and is positioned above the gear shaft 19. A through hole is formed in the middle of the fixed block 17. The through hole should be coaxial with the lower connecting shaft 18, and the spiral strip 182 on the lower connecting shaft 18 is positioned in the through hole. A small clearance is formed between the spiral strip 182 and the through hole, and the clearance width on one side is 0.05-2 mm, for example.

During working, the spiral strip 182 of the lower connecting shaft 18 may deliver oil in the decelerator to the upper end of the driving shaft 12, i.e., the first end of the driving shaft 12, via holes around the driving shaft 12. Through the sleeve 9, the inner spline 121 at the first end of the driving shaft 12 and the second sealing assembly 8 of the power equipment can be continuously lubricated and cooled (the components can be lubricated and cooled even if the decelerator has a little oil); and the oil overflowing from the upper end of the sleeve 9 returns to the gear box through the oil return hole 30 in the support frame 14 and the support plate 15.

The circulating hole 123 is machined on the bottom surface of the inner spline at the first end of the driving shaft 12 along the direction which and the axis of the driving shaft form a certain angle, and the circulating hole 123 can ensure that the oil in the inner spline 121 of the driving shaft 12 flows to better lubricate and cool the inner spline 121.

As shown in FIG. 5, the driving device of trench cutter of the present invention further includes magnetic adsorption equipment, which is specifically a magnet 11. The magnet 11 is fixed on the support frame 14, is positioned between the sleeve 9 and the power equipment installation seat 4, and can filter impurities from the oil.

Compared with the prior art, the driving device of trench cutter has the advantages that a common motor provides power, so that the cost of the whole machine can be effectively lowered; in the brand-new driving design, the service life of the driving shaft 12 can be effectively prolonged by changing the engaging position of a drum tooth spline coupling, meanwhile, the axial size of the driving device can be easily met by changing the axial size of the upper connecting shaft 10, so that the axial machining precision of each part of the driving device is greatly reduced. In the working process, the lubricating oil is internally circulated to continuously lubricate the upper driving device and lubricate and cool the mechanical seal so as to prolong the service life of the mechanical seal.

Another embodiment of the present invention further provides a trench cutter, including the driving device of trench cutter provided by any technical solution of the present invention.

In the description of the present invention, it should be understood that, the directions or position relations indicated by the terms like "center", "longitudinal", "transverse", "front", "back", "left", "right", "vertical", "horizontal", "top", "bottom", "inner", "outer" are the ones shown by the accompanying drawings, are merely used for conveniently describing the present invention and simplifying the description, instead of indicating or hinting that the indicated devices or elements must have specific directions or be constructed or operated in specific direction, and therefore cannot be understood as limiting the protection scope of the present invention.

Finally, it should be noted that, the above embodiments are merely used for describing the technical solutions of the present invention, rather than limiting the present invention; although the present invention is described in detail with reference to the preferred embodiments, it should be understood by those of ordinary skill in the art that modifications may still be made on the specific implementations of the present invention, or equivalent substitutions may be made to part of technical characteristics thereof; and these modifications or substitutions do not depart from the spirits of the technical solution of the present invention, and shall fall into the technical solution scope of the present invention.

What is claimed is:

1. Power equipment, comprising a motor (1), a motor installation seat (2), a base (3), and a transmission shaft (6), wherein:
   the motor installation seat (2) is provided with an inner cavity as well as a first installation hole (24) and a second installation hole (25) formed in two ends of the inner cavity respectively;
   the motor (1) is installed at an upper part of the motor installation seat (2) and is sealingly connected with the motor installation seat (2); a motor output shaft (70) of the motor (1) extends into the inner cavity through the first installation hole (24);
   one end of the transmission shaft (6) extends into the inner cavity through the second installation hole (25) and is drivingly connected with the motor output shaft (70), a middle part of the transmission shaft (6) and the second installation hole (25) are sealingly connected, and another end of the transmission shaft (6) extends out of the second installation hole (25);
   the motor installation seat (2) is provided with an installation plate extending inwards and a side plate extending downwards, and the second installation hole (25) is formed in the installation plate;
   the base (3) is provided with a third installation hole, and the other end of the transmission shaft (6) extends below the base (3) through the third installation hole;
   the base (3) is installed below the side plate, and a detection cavity for detecting whether oil leaks is formed among the side plate, the base (3), the installation plate and the transmission shaft (6); and
   a second sealing assembly (8) is arranged between the transmission shaft (6) and the third installation hole.

2. The power equipment of claim 1, wherein a motor oil drainage cavity of the motor is integrated with the inner cavity of the motor installation seat (2).

3. The power equipment of claim 1, wherein a first sealing assembly (5) is arranged between the middle part of the transmission shaft (6) and the second installation hole (25);
   the second installation hole (25) is a step hole; and
   the first sealing assembly (5) comprises a dynamic ring (51) and a static ring (52), the static ring (52) is fixed on a step in the step hole, the dynamic ring (51) is fixed at the middle part of the transmission shaft (6), and sealing surfaces mating with each other exist between the dynamic ring (51) and the static ring (52).

4. The power equipment of claim 1, wherein a first bearing installation seat (31) is arranged in the inner cavity of the motor installation seat (2), and one end of the transmission shaft (6) is installed in the first bearing installation seat (31) through a first bearing (34).

5. The power equipment of claim 1, further comprising an auxiliary fixing plate (23), one end of the auxiliary fixing plate (23) is fixed with the base (3), a second bearing seat is arranged at the other end of the auxiliary fixing plate (23), the second bearing seat is positioned in a through hole of the auxiliary fixing plate (23), and another end of the transmission shaft (6) extends below the base (3) and is installed in the second bearing seat through a second bearing (32).

* * * * *